(12) United States Patent
Umiji

(10) Patent No.: US 6,618,510 B1
(45) Date of Patent: Sep. 9, 2003

(54) METHOD AND APPARATUS FOR PROCESSING IMAGE DATA

(75) Inventor: Keita Umiji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/496,954

(22) Filed: Feb. 3, 2000

(30) Foreign Application Priority Data

Feb. 5, 1999 (JP) .......................................... 11-028105

(51) Int. Cl.[7] .................................................. G06K 9/40
(52) U.S. Cl. ........................ 382/260; 382/282; 382/280
(58) Field of Search ................................ 382/260–264, 382/266, 277, 191, 275, 248, 210, 280, 282; 708/403, 404

(56) References Cited

U.S. PATENT DOCUMENTS

| | | | | |
|---|---|---|---|---|
| 4,618,990 A | * | 10/1986 | Sieb, Jr. et al. ............. | 382/266 |
| 5,181,254 A | * | 1/1993 | Schweizer et al. .......... | 382/100 |
| 5,315,668 A | | 5/1994 | O'Hair | |
| 5,719,958 A | * | 2/1998 | Wober et al. ................ | 382/199 |
| 5,832,118 A | * | 11/1998 | Kim ........................... | 382/224 |
| 5,949,910 A | * | 9/1999 | Go .............................. | 382/233 |
| 6,141,456 A | * | 10/2000 | Pearlstein et al. .......... | 382/250 |
| 6,226,414 B1 | * | 5/2001 | Go .............................. | 382/240 |
| 6,285,801 B1 | * | 9/2001 | Mancuso et al. ........... | 382/268 |
| 6,330,367 B2 | * | 12/2001 | Go .............................. | 382/240 |
| 6,360,024 B1 | * | 3/2002 | Tan et al. .................... | 382/260 |

FOREIGN PATENT DOCUMENTS

| | | |
|---|---|---|
| JP | 58-110869 | 7/1983 |
| JP | 64-65486 | 3/1989 |
| JP | 1-201182 | 8/1989 |
| JP | 2-287887 | 11/1990 |
| JP | 8-152472 | 6/1996 |
| JP | 9-281223 | 10/1997 |
| JP | 10-191065 | 7/1998 |
| JP | 10-208037 | 8/1998 |

OTHER PUBLICATIONS

Japanese Office Action, dated Jan. 16, 2001, with English language translation of Japanese Examiner's comments.

* cited by examiner

*Primary Examiner*—Bhavesh M. Mehta
*Assistant Examiner*—Aaron Carter
(74) *Attorney, Agent, or Firm*—Whitham, Curtis & Christofferson, P.C.

(57) ABSTRACT

To extract a target object having a desired size from a bidimensonal image, horizontal direction filtering suppresses image components less than the desired size in the horizontal direction and thereby outputs a result of horizontal filtering. At the same time, vertical direction filtering suppresses image components less than the desired size in the vertical direction and thereby outputs a result of vertical filtering. The results of the horizontal and vertical filtering are superposed to produce a final filtered result corresponding to the target object. During the filtering, pixel data making up the bidimensonal image are sequentially connected in the vertical or horizontal direction in a preselected connecting area to produce gradation sequence of the pixels and then subjected to FFT to transform the gradation sequence into frequency domain and to thereby frequency selection to select desired harmonics components corresponding to the target object from the FFT result.

16 Claims, 13 Drawing Sheets

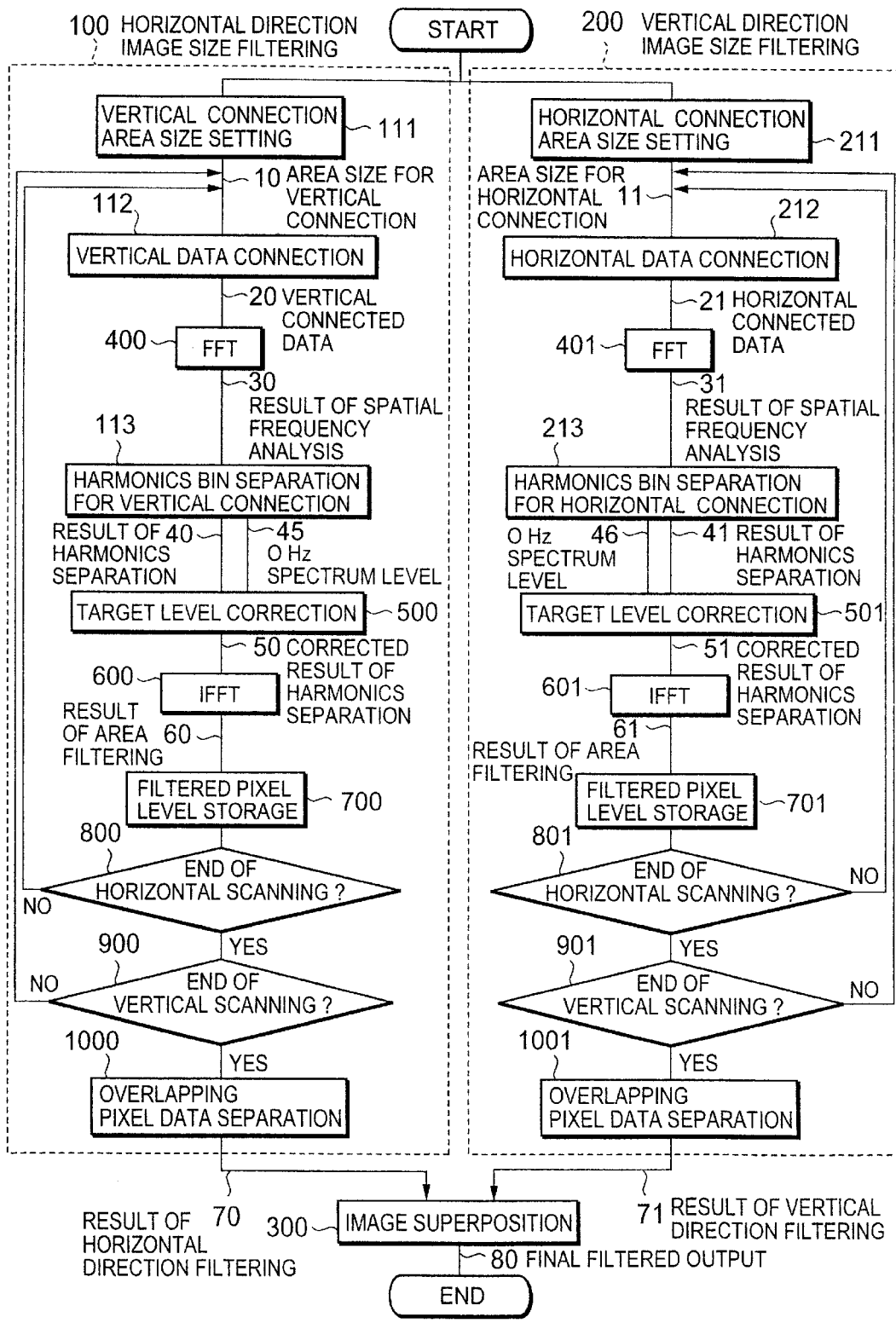

FIG.7A
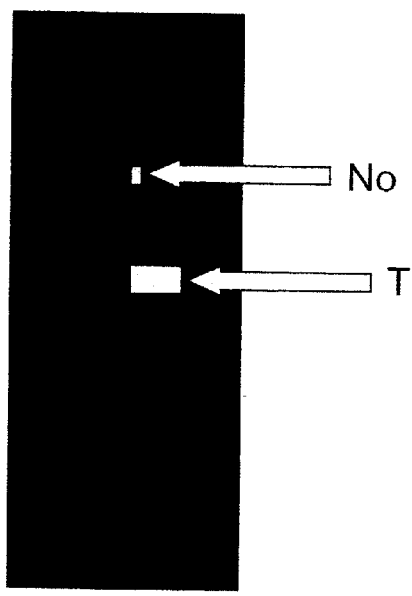
FIG.7B    FIG.7C    FIG.7D
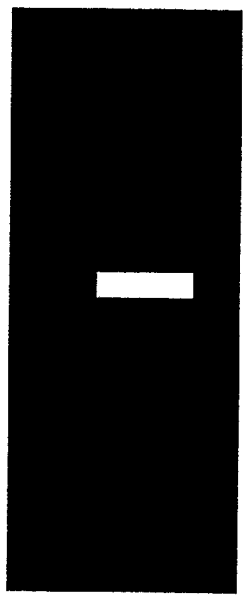 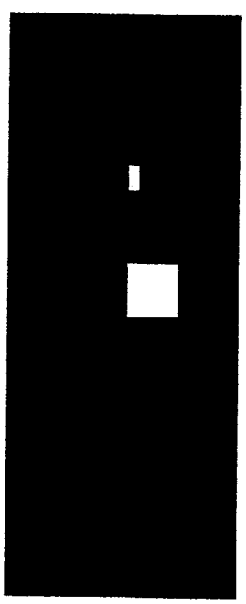 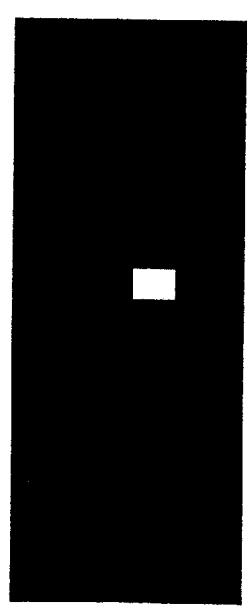

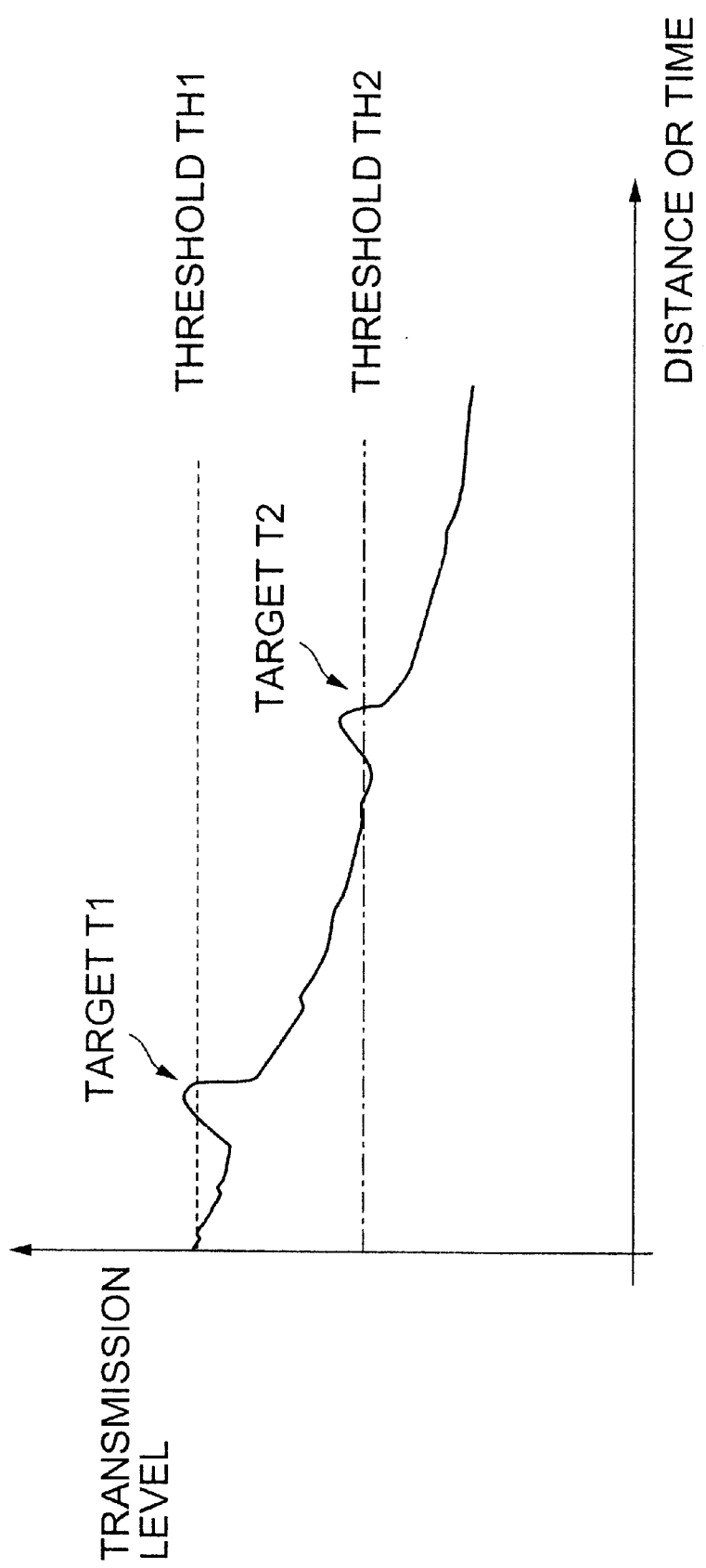

METHOD AND APPARATUS FOR PROCESSING IMAGE DATA

BACKGROUND OF THE INVENTION

The present invention relates to an image data processing method for separating a target object having a preselected size from bidimensional image data input via a radar or a sonar, and an apparatus therefor. More particularly, the present invention is concerned with a new image data processing method capable of extracting a target object having a preselected size even from data having a low S/N (Signal-to-Noise) ratio or involving background noise, and an apparatus therefor.

It is a common practice with a sonar image processing apparatus to separate a target by removing a reverberation image from an underwater acoustic image in which the target exists in reverberations. To improve the image quality of the screen, it has been customary to use a threshold scheme, as taught in, e.g., Japanese Utility Model Laid-Open Publication No.S58-110869 and Japanese Patent Laid-Open Publication No.H1-201182. As shown in FIG. 11 of the drawings specifically, the threshold scheme determines whether or not signals or echoes received by a sonar have levels higher than a preselected threshold level and displays only signals whose levels are higher than the threshold level on a sonar screen. However, the conventional threshold scheme has some problems left unsolved, as follows.

It is necessary for the operator to adjust the threshold manually while watching a sonar image screen. This is troublesome particularly when the level of echoes from a target object and the level of background noise or that of reverberations are extremely close to each other, i.e., S/N ratio or S/R ratio is low. Specifically, in such a condition, the operator must adjust the threshold to an extremely narrow range shown in FIG. 12 specifically. The adjustment therefore needs expertness.

Further, assume a specific sonar image screen in which the general receipt level varies with respect to distance or time as shown in FIG. 13. Then, if the threshold is adjusted to, e.g., TH1 in order to separate a target object T1, then the image of a target object T2 is lost. Moreover, the receipt level distribution sometimes varies in a single sonar image, depending on the azimuth of receipt. This is likely to discard necessary information when a single threshold is applied.

SUMMARY OF THE INVENTION

It is therefore an object of the present invention to provide an image data processing method capable of separating the image of a target object existing in background noise and reverberations without requiring the operator to perform threshold adjustment, and an apparatus for practicing the same It is another object of the present invention to provide an image data processing method capable of detecting all of a plurality of target objects even in a single image in which the distribution of receipt levels varies, and an apparatus for practicing the same.

In accordance with the present invention, there is provided an image data processing method for processing data of a bidimensional image to extract a target from the bidimensional image, the bidimensional image including pixels arranged in horizontal and vertical directions, the data being representative of gradation of each of said pixels, comprising: (a) sequentially connecting, in a bidimensional connecting area having a preselected size, data of pixels in a vertical or horizontal direction to produce a gradation change signal; (b) executing FFT (Fast Fourier Transform) with the gradation change signal to thereby generate frequency harmonics components representative of the gradation change signal in frequency domain; (c) selecting predetermined harmonics components from the frequency harmonics components, the predetermined harmonics components corresponding to size of the target. Further, the image data processing method according to the present invention comprises steps of (d) executing IFFT (Inverse Fast Fourier Transform) with the selected predetermined harmonics components into time domain to reproduce image data of the target and (e) correcting levels of the selected predetermined harmonics components to be supplied to the step (d) in accordance with a DC component in the FFT result.

Also, in accordance with the present invention, there is provided an image data processing apparatus for processing data of a bidimensional image to detect a predetermined sized object, the bidimensinal image having pixels arranged in horizontal and vertical directions, the data being representative of gradation of each of said pixels, comprising: a memory for storing data of a bidimensional image; means for sequentially reading the gradation of each pixel in a vertical or horizontal direction in a connecting bidimensional area designated in the bidimensional image to produce a gradation change signal, the connecting bidimensional area being determined in accordance with size of the predetermined sized object; transforming means for FFT transforming the gradation change signal into frequency domain to deliver a plurality of frequency components; and selecting means for selecting desired frequency components from the plurality of frequency components transformed by the transforming means, the desired frequency components corresponding to size of the predetermined sized object. Further, the image data processing apparatus according to the present invention comprises IFFT means for IFFT transforming the desired frequency components into time domain to reproduce image data of the predetermined sized object and correcting means for correcting levels of the desired frequency components to be supplied to the IFFT means in accordance with a DC component in the FFT result.

BRIEF DESCRIPTION OF THE DRAWINGS

The above and other objects, features and advantages of the present invention will become more apparent from the following detailed description taken with the accompanying drawings in which:

FIG. 1 shows a first embodiment of the present invention;

FIGS. 7A through 7D show the result of a specific simulation effected with the illustrative embodiment;

FIGS. 12 and 13 are graphs for describing problems with the conventional threshold scheme.

DESCRIPTION OF THE PREFERRED EMBODIMENTS

Figures 2A, 2B:
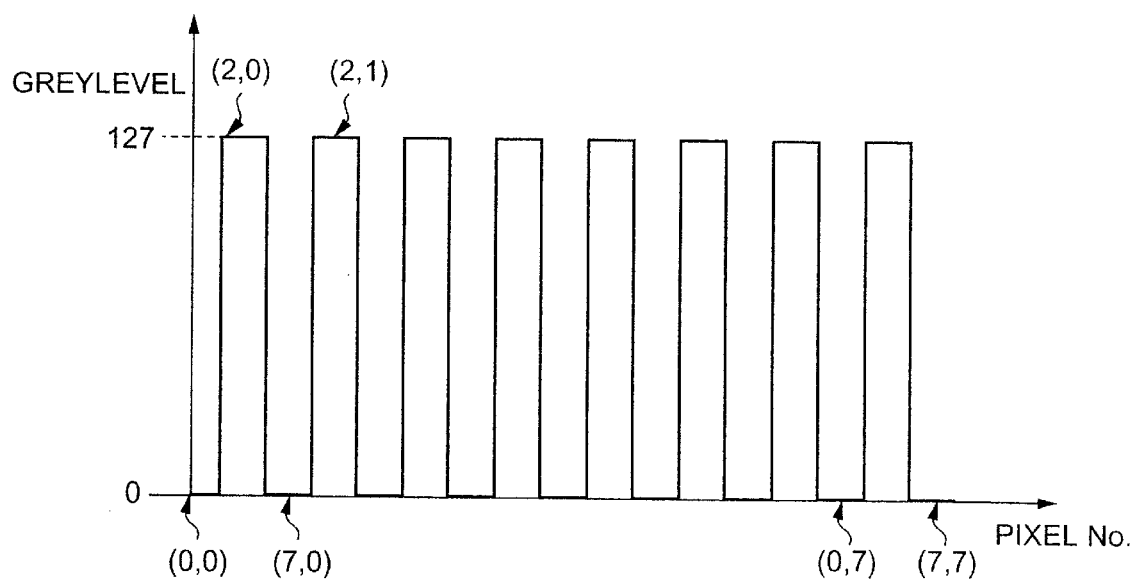
FIG. 2A demonstrates how the illustrative embodiment connects data in a connection area of a bidimensional image in the vertical direction.
FIG. 2B shows gradation change sequence having a rectangular wave shape obtained by a connecting operation shown in of FIG. 2A.

Referring to FIG. 1 of the drawings, an image data processing apparatus embodying the present invention and representative of an image data processing method also is shown. As shown, the apparatus is generally made up of a horizontal direction image size filtering 100, a vertical direction image size filtering 200, and an image superposition 300. In this case, image data to be processed are digital data of multi-bits representative of gradations (multi-levels) and given for each of pixels making up a bidimensional image. The gradations or multi-levels are referred to greylevels, hereinafter.

The horizontal direction image size filtering 100 includes a vertical connection area size setting 111, a vertical data connection 112, an FFT 400, a harmonics bin separation 113 for vertical connection, a target level correction 500, an IFFT 600, a filtered pixel level storage 700, a decision 800 on the end of horizontal scanning, a decision 900 on the end of vertical scanning, and an overlapping pixel data separation 1000.

The vertical direction image size filtering 200 is identical with the horizontal direction image size filtering 100 except that it includes a horizontal connection area size setting 211, a horizontal data connection 212 and a harmonics bin separation 213 for horizontal connection in place of the vertical connection area size setting 111, vertical data connection 112, and harmonics bin separation 113, respectively. A specific operation of the illustrative embodiment will be described hereinafter on the assumption that a target object has a size defined by a pixels in the vertical direction and b pixels in the horizontal direction.

First, in the horizontal direction image size filtering 100, the vertical connection area size setting 111 sets an area size 10 for vertical connection, i.e., the number of pixels A1 in the vertical direction and the number of pixels B1 in the horizontal direction. Specifically, the number of pixels B1 is equal to the horizontal size of the desired target object image (B1=b) while the number of pixels A1 is greater than the vertical size of the target object image (A1>a). Subsequently, the vertical data connection 112 sequentially connects image data vertically in the above connection area, as will be described in detail later. The resulting data 20 connected together are fed to the FFT 400. The FFT 400 executes FFT with the input data 20 and delivers the result 30 of spatial frequency analysis to the harmonics bin separation 113. The harmonics bin separation 113 determines, based on the number of pixels A1 and B1 which is determined in accordance with the target size, harmonics spectrum bins with the following equation:

reference frequency bin number=(A1×B1/2)/(B1/2) harmonics spectrum bins=reference frequency bin number×N+reference frequency bin number  Eq. (1)

where N is an integer greater than or equal to zero, but smaller than or equal to ((A1×B1/reference frequency bin number)−2).

(0≦N≦((A1×B1/reference frequency bin number)−2))

The harmonics bin separation 113 feeds to the target level correction 500 the result 40 of harmonics separation in which the outputs of bins other than the harmonics spectrum bins defined in the equation (1) are made zero. At the same time, the separation 113 feeds to the target level correction 500 0 Hz spectrum data (complex data) data 45 representative of a DC component and included in the result of spatial frequency analysis 30. The target level correction 500 first determines DC component power 51 based on the 0 Hz spectrum data 45 by using:

DC power 51=SQRT(real×real+imag×imag)  Eq. (2)

Subsequently, the correction 500 produces a harmonics level correction factor 52 from the DC component power 51 by using:

$$\text{harmonics level correction factor } 52 = \text{number of greylevels}/(\text{number of greylevels} - \text{DC component power } 51) \quad \text{Eq. (3)}$$

Further, the correction 500 multiplies the result 40 of harmonics separation by the harmonics level correction factor 52, and delivers the adjusted product to the IFFT 600 as a result of harmonics separation 50. In the Eq. (3), the number of greylevels corresponds to the number of pixel level gradations; for example, if the number of greylevels is 128 ($2^7$), then the pixel levels range from 0 to 127.

The IFFT 600 executes IFFT with the result 50 of harmonics separation and then feeds a result 60 of area filtering to the filtered pixel level storage 700. The storage 700 sequentially records the result of area filtering 60 in accordance with the arrangement of pixel numbers (pixel address) of the entire bidimensional image.

After the above sequence of steps, the decision 800 assigned to horizontal scanning determines whether or not the area image scanning has been executed over the entire bidimensional image in the horizontal direction. If the answer of this decision is negative (No), the steps 112 through 700 are repeated with the connection area shifted by one pixel in the horizontal direction. If the answer of the above decision is positive (Yes), the decision 900 assigned to vertical scanning determines whether or not the area image scanning has been executed over the entire bidimensional image in the vertical direction. If the answer of this decision is Yes, the operation advances to the overlapping pixel data separation 1000. At this instant, after the entire bidimensional image is scanned, the filtering processing is repeated several times with respect to each pixel point while the filtering result is recorded in the filtered pixel level storage 700. The overlapping pixel data separation 1000 detects, pixel by pixel, maximum values out of the pixel-by-pixel overlapping data recorded in the storage 700 and delivers them to the image superposition 300 as a result of horizontal filtering 70.

The vertical direction image size filtering 200 is similar in configuration to the horizontal direction image size filtering 100 except that it implements a filtering effect in the opposite direction to the filtering 100. Specifically, the horizontal connection area size setting 211 sets an area size 11 for horizontal connection, i.e., the number of pixels A2 in the vertical direction and the number of pixels B2 in the horizontal direction. The number of pixels A2 is equal to the number of pixels of the target object image in the vertical direction (A2=a) while the number of pixels B2 is greater than the number of pixels of the same image in the vertical direction (B2>b). In this sense, the vertical image size filtering 200 is opposite to the horizontal image size filtering 100. Subsequently, the horizontal data connection 212 connects pixel data horizontally in the connection area and feeds horizontally connected data 21 to the FFT 401. The filtering 200 therefore differs from the filtering 100 as to the method of setting the connection area size and the data connecting direction.

The harmonics bin separation 213 assigned to horizontal connection determines, based on the number of pixels A2 and B2, harmonics spectrum bins with the following equation:

reference frequency bin number=(A2×B2/2)/(A2/2) harmonic spectrum bins=reference frequency bin number×N+reference frequency bin number  Eq. (4)

where N is an integer greater than or equal to zero, but smaller than or equal to ((A2×B2/reference frequency bin number)−2).

(0≦N≦((A2×B2/reference frequency bin number)−2))
The Eq. (4) differs from the Eq. (1) as to the denominator.

The filtering 200 therefore differs from the filtering 100 as to the method of determining harmonics frequency bins from the result of spatial frequency analysis also. The filtering 200 outputs a result 71 of vertical filtering to the image superposition 300.

The image superposition 300 superposes the result 70 of horizontal filtering and the result 71 of vertical filtering, i.e., two filtered images and thereby produces a final filtered output 80. More specifically, the image superposition 300 produces a geometrical mean of each corresponding pixels of the two different results 70 and 71:

final filtered output (x, y) 80 = SQRT (result of vertical filtering (x, y) 70 × result of horizontal filtering (x, y) 71)  Eq. (5)

where x and y respectively denote a pixel number in the horizontal direction and a pixel number in the vertical direction.

The operation of the illustrative embodiment shown in FIG. 1 will be described more specifically. First, in the horizontal image size filtering 100, the vertical connection area size setting 111 sets an connection area size 10 for vertical data connection. Subsequently, the vertical data connection 112 connects pixel level data in the above area and delivers the resulting vertical connection data 20 to the FFT 400.

The vertical data connection 112 will be described more specifically with reference to FIGS. 2A and 2B showing an example of the data connecting area. In FIG. 2A, a specific object size (a,b) is defined by four pixels vertically and by eight pixels horizontally, (a=4, b=8). First, the vertical connection area size setting 111 outputs the area size 10 having eight pixels horizontally which are equal to the horizontal size (eight pixels) of the target object, and having eight pixels vertically which are greater than the vertical size (four pixels) of the same, (A1=8 and B1=8). Considering FFT to be executed later, the total number of pixels in the area should preferably be factorial 2. In FIG. 2A, each pixel is assumed to have greylevels ranging from 0 to 127; the pixels having greylevel 127 are representative of the target object image.

The vertical data connection 112 first connects the above data from a pixel number (0 (vertical)), 0 (horizontal)) to a pixel number (7,0), connects the data from a pixel number (0,1) to a pixel number (7,1) and then sequentially connects the other data up to a pixel number (7,7). FIG. 2B shows the result of such data connection in a graph in which the ordinate and abscissa indicate the number of pixels and greylevel, respectively. As shown, the target object image is represented by a rectangular wave shape. It follows that if the target object exists in the area, frequency analysis executed with the vertically connected data allows the object image to be detected as a preselected harmonics component in the spatial frequency domain. It will therefore be seen that the target object can be separated if attention is paid to harmonics at the output of the FET stage.

The FFT 400 executes frequency analysis with the vertically connected data, transforms the data in the pixel domain to data in the spatial frequency bin domain, and delivers the result of spatial frequency analysis 30 to the vertical harmonics bin separation 113. In the illustrative embodiment, the reference frequency bin number of harmonics is produced by:

(8(number of area vertical pixels)×8(number of area horizontal pixels)/2)/(8(number of area horizontal pixels)/2)=8

Therefore, the outputs of the spatial frequency bins #8, #16, #24, #32, #40, #48 and #56 are harmonics output bins, in which #40, #48 and #56 are aliasing frequency components. The separation 113 delivers to the target level correction 500 the result of harmonics separation in which the bins other than the above harmonics output bins are made zero. At the same time, the separation 113 produces a 0 Hz spectrum level 45 from the output of a bin #0 corresponding to a DC component (0 Hz) in the spatial frequency domain:

0 Hz spectrum level=SQRT (real*real+imag*imag)  Eq. (6)

where real and imag are representative of the FFT complex outputs of 0 Hz.

The separation 113 feeds the above 0 Hz spectrum level to the target level correction 500. The target level correction 500 corrects the target image level on the basis of the 0 Hz spectrum level and the results of higher harmonic separation, and delivers the corrected target image level to the IFFT 600 as a corrected result 50 of the harmonic separation.

Figure 3A:
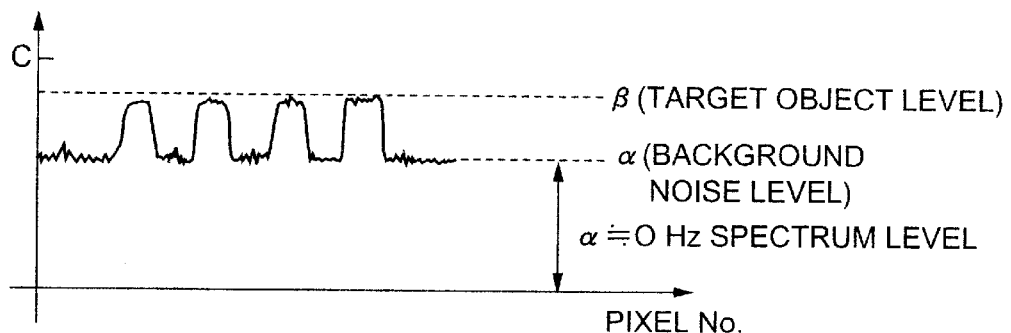
FIG. 3A shows a specific rectangular wave involving background noise.
Figure 3B:
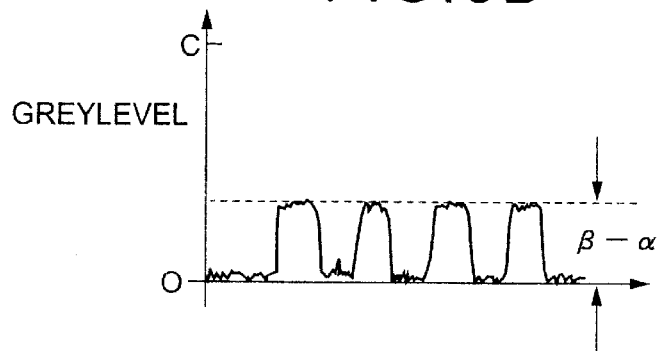
FIG. 3B shows a rectangular wave representative of the result of harmonics separation not subjected to target level correction unique to the illustrative embodiment.
Figure 3C:
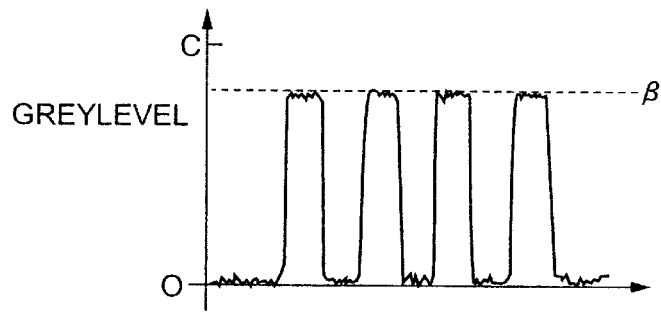
FIG. 3C shows a rectangular wave representative of the result of harmonics separation achievable with the target level correction of the illustrative embodiment.

The target level correction 500 will be described more specifically with reference to FIGS. 3A, 3B and 3C. FIG. 3A assumes a specific image whose greylevel ranges from 0 to C and in which a target object having a greylevel β exists in a background noise level varying around a greylevel α. In this case, the 0 Hz spectrum level fed to the correction 500 is substantially equal to the mean value α of the background noise level. That is, the DC component spectrum level included in the result of spatial frequency analysis is substantially equal to the background level of the image. The correction 500 therefore produces a harmonics level correction factor 52 by using:

$$\text{harmonics level correction factor} = \qquad \text{Eq. (7)}$$
$$C/(C - (0\ Hz\ spectrum\ evel))$$

where C denotes the number of greylevels of the image. For example, if the image has 128 greylevels, then the greylevels are integers ranging from 0 to 127, and 127 is given as the number of greylevels C of the image.

The correction 500 multiples the result of harmonics separation by the above factor and outputs the resulting product as the corrected result of harmonics separation 50. As shown in FIG. 3B, should the result of harmonics separation be directly fed to the IFFT 600 without the above target level correction and returned from the spatial frequency domain to the pixel domain thereby, the level of the target object image would decrease in accordance with a background level. In other words, when only harmonics components without the DC component are applied to the IFFT 600, the target level falls due to the removal of the DC component though the background level may be canceled. To solve this problem, the correction 500 multiplies the result of harmonics separation by the DC component corresponding to the background level as the harmonics level correction factor. As a result, as shown in FIG. 3C, the target object level is successfully preserved with the background level fully canceled, when restored to data lying in the pixel domain.

The IFFT 600 returns the corrected result 50 of harmonics separation in the spatial frequency domain to data in the pixel domain by IFFT. The IFFT 600 then delivers the data in the pixel domain to the filtered pixel level storage 700 as a result 60 of area filtering. IFFT is successful to reproduce a target object image represented by harmonics components while reducing the level of background noise and image components other than the harmonics components corresponding to the target.

The filtered pixel level storage 700 sequentially records the result 60 of area filtering, which is the data present in the area image, in accordance with the arrangement of pixel numbers of the entire bidimensional image. At this time, the decision 800 determines whether or not the entire image has been scanned in the horizontal direction. This decision will be schematically explained with reference to FIG. 4.

Figure 4:
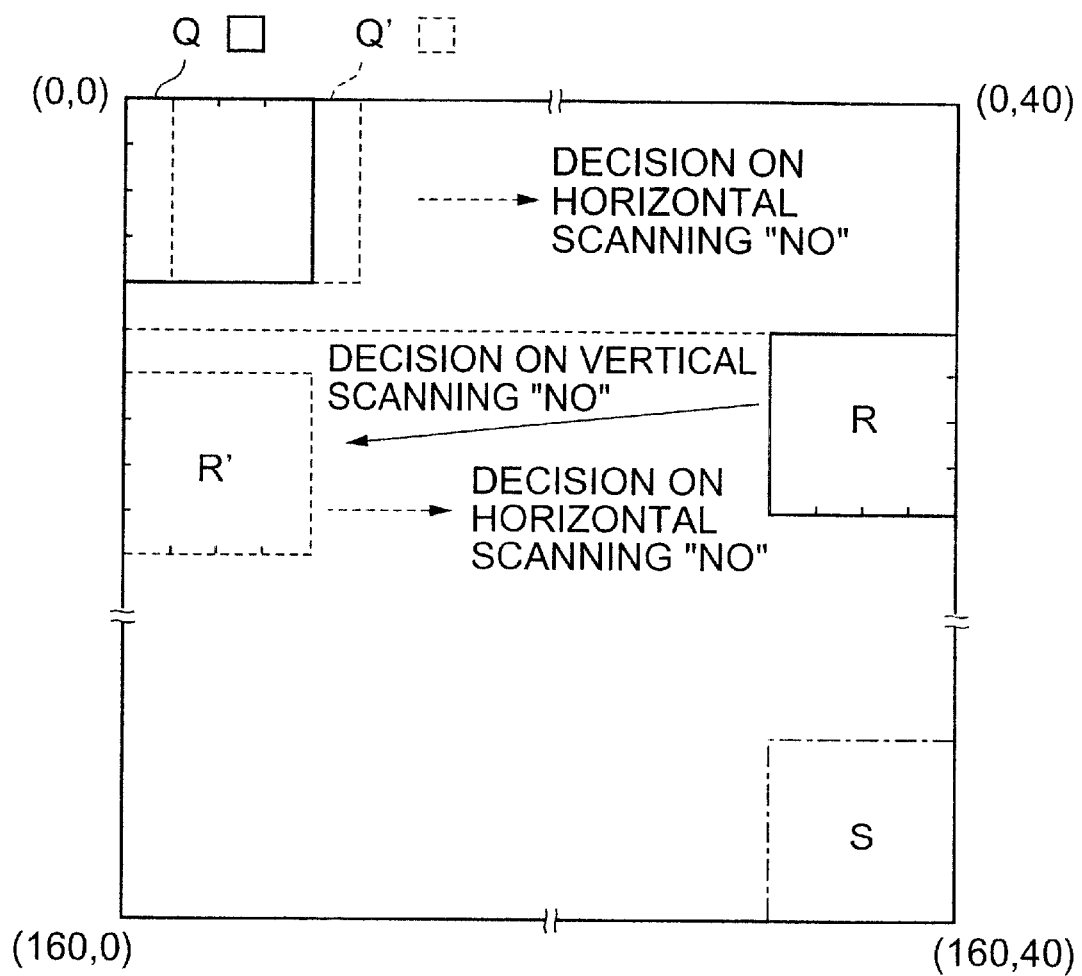
FIG. 4 schematically shows scanning of filtering operation in the connecting area and decision on the end of vertical scanning and the end of horizontal scanning included in the illustrative embodiment.

In FIG. 4, the entire bidimensional image is assumed to have forty pixels in the horizontal direction and the connection area image is assumed to have four pixels in the same direction. In this case, the horizontal filtering operation (referred to horizontal looping hereinafter) is repeated (40−4+1) times. The repeat operation is referred to scanning in the embodiment. If such horizontal scanning has not ended yet, the connection area is shifted by one pixel horizontally in the entire bidimensional image (from an area Q to an area Q', FIG. 4). This is followed by the step 112 and successive steps. If the horizontal scanning has ended, the decision 900 determines whether or not the vertical area image scanning has been executed over the entire bidimensional image.

The decision 900 assigned to vertical scanning will be described more specifically with reference to FIG. 4. In FIG. 4, the entire bidimensional image is assumed to have 160 pixels in the vertical direction while the connection area is assumed to have four pixels in the same direction.

In this case, vertical looping is repeated (160−4+1) times. If the vertical scanning has not ended yet, the pixel is returned to the pixel #0 in the direction of abscissa while an area R is shifted by one pixel to an area R' in the vertical direction. This is followed by the vertical data connection 112 and successive steps. If the vertical scanning has ended, the overlapping pixel data separation 1000 is executed. It is to be noted that the end of vertical scanning refers to a condition wherein the area has reached an area S, i.e., the end of area image scanning effected over the entire bidimensional image.

While the entire bidimensional image is scanned on the connection area basis, the same pixel point is repeatedly scanned a plurality of times. The filtered pixel level storage 700 sequentially records information relating to such pixel points. The overlapping pixel data separation 1000 detects, pixel by pixel, the maximum values of the pixel-by-pixel overlapping data stored and delivers them to the image superposition 300 as a result of horizontal filtering 70.

Figure 5A:
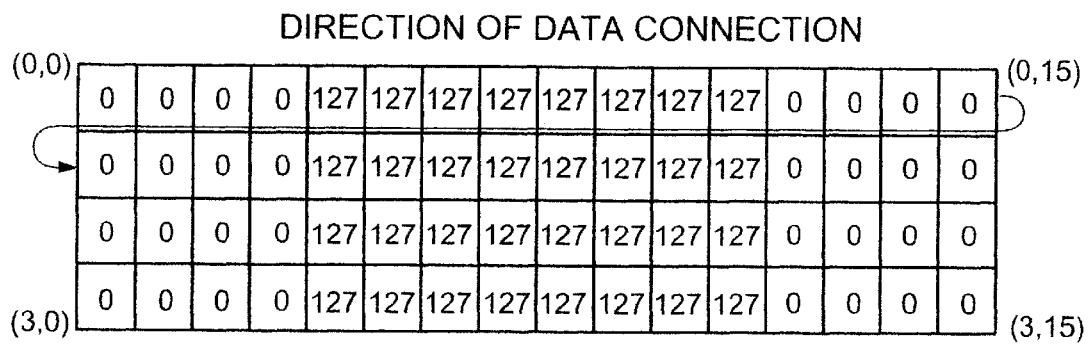
FIG. 5A demonstrates how the illustrative embodiment connects data in a connection area of the bidimensional image in the horizontal direction.

The vertical image direction size filtering 200 will be described more specifically, paying attention to the difference between it and the horizontal direction image size filtering 100. First, the horizontal connection area size setting 211 sets the size of a horizontal connection area 11. Specifically, as shown in FIG. 5A, the setting 211 sets four pixels in the vertical direction which is equal to the vertical size of the target object image (A2=4), and sets sixteen pixels in the horizontal direction which is greater than the horizontal size of the same image (B2=16). The above vertical size of the target object image is contrary to the vertical size set in the vertical connection size setting.

Subsequently, the horizontal data connection 212 connects pixel data lying in the above area in the horizontal direction and delivers the resulting horizontal connected data 21 to the FFT 401. That is, the horizontal data connection 212 is opposite to the vertical data connection 112 in that it connects pixel data horizontally, as shown in FIG. 5A.

Figure 5B:
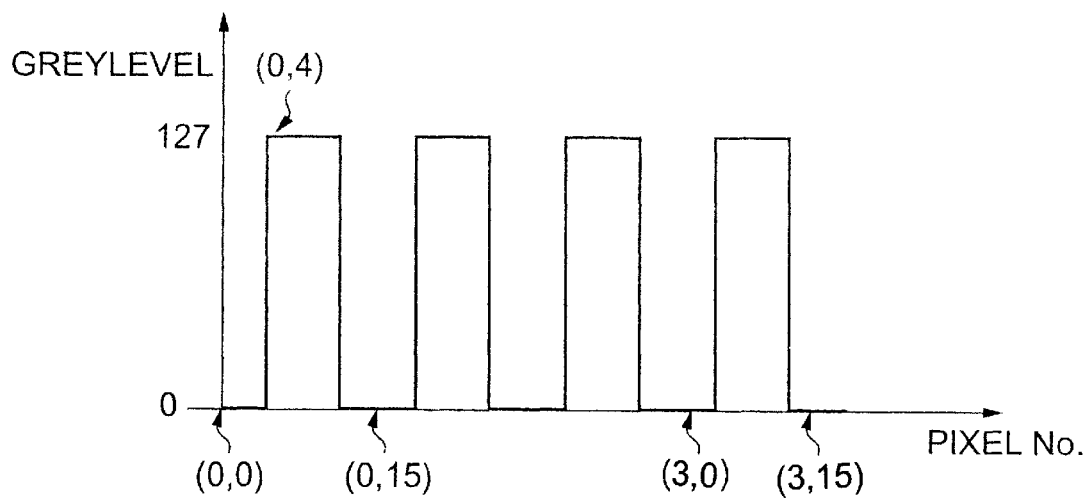
FIG. 5B shows gradation change sequence having a rectangular wave shape obtained by the connecting operation shown in FIG. 5A.

The horizontal data connection 212 will be described more specifically with reference to FIGS. 5A and 5B. In FIG. 5A, the horizontal connection area is assumed to have a size defined by four pixels vertically and by sixteen pixels horizontally. The connection 212 first connects pixels (0,0) to (0,15), then connects pixels (1,0) to (1,15), and then repeats the connection up to a pixel (3,15). FIG. 5B shows the result of connection in the form of a graph having a rectangular wave shape, whose ordinate and abscissa indicate the number of pixels and the greylevel, respectively. It should be noted that the graph of FIG. 5B differs in frequency from the graph of FIG. 2B. Therefore, in the vertical direction image size filtering 200, the harmonics bin separation 213 performs calculation by use of the Eq. (4), as follows.

In the illustrative embodiment, the reference frequency bin number of harmonics is produced by:

(4(number of area vertical pixels)×16(number of area horizontal pixels)/2)/(16(number of area horizontal pixels)/2)=4

Therefore, the outputs of the spatial frequency bins #4, #8, #12, #16, #20, #24, #28, #32, #36, #40, #44, #48, #52, #56 and #60 are harmonics output bins, in which #36, #40, #44, #48, #52, #56 and #60 are aliasing frequency components. It will be seen that the reference frequency is lower in the harmonics bin separation in the horizontal direction than in the previously stated harmonics bin separation in the vertical direction.

As stated above, the vertical direction image size filtering 200 executes filtering by paying attention to the vertical image size and delivers the result 71 of vertical filtering to the image superposition 300.

Figure 6:
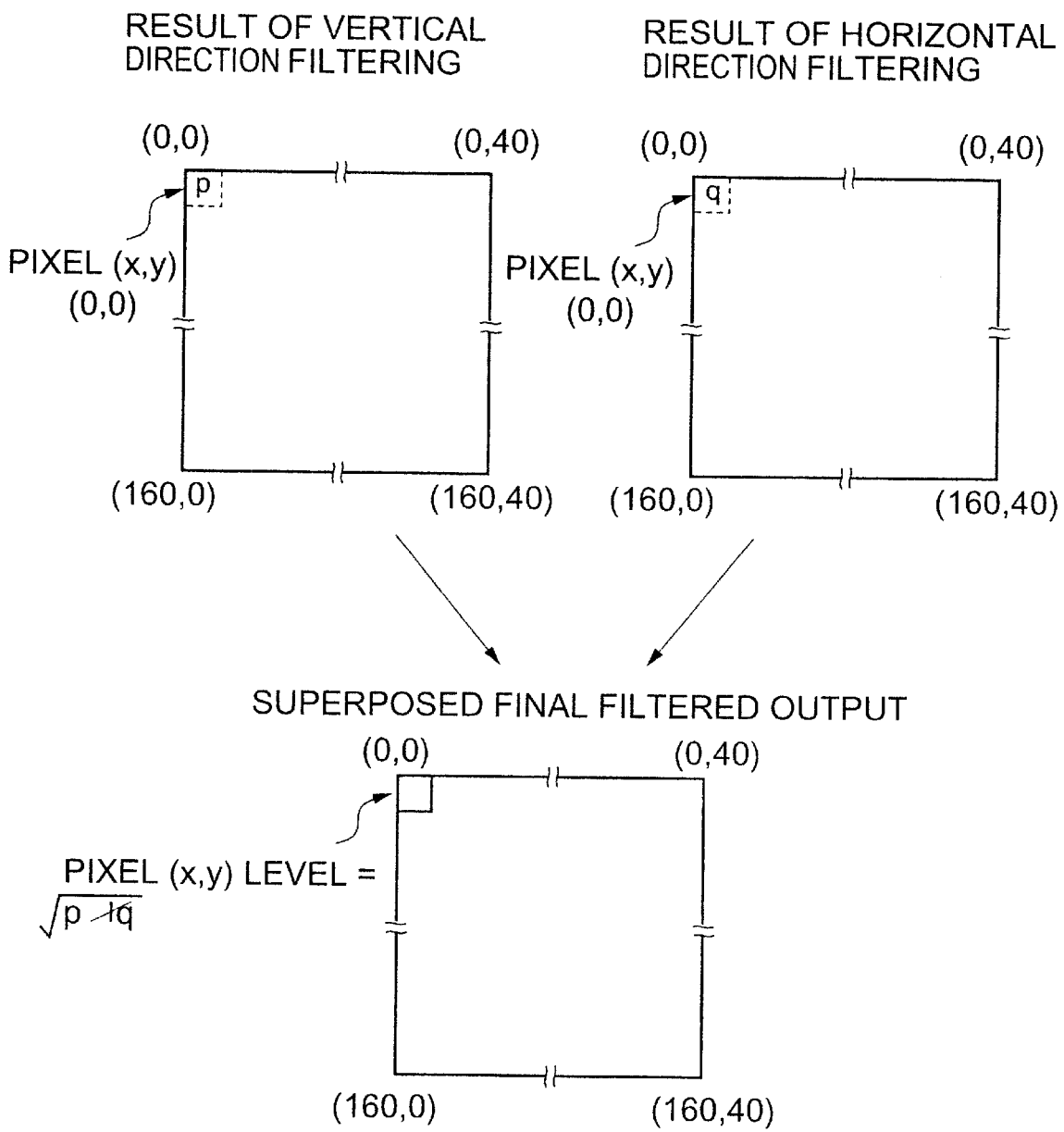
FIG. 6 shows how the illustrative embodiment superposes two results of filtering and produces a final filtered output.

Reference will be made to FIG. 6 for describing the image superposition 300 in detail. FIG. 6 shows a specific sonar image having 160 pixels in the vertical direction and forty pixels in the horizontal direction. The horizontal and vertical direction image size filterings 100 and 200, respectively, each filter the sonar image and output the result of horizontal or vertical filtering. The image superposition 300 produces the geometrical mean of each two corresponding pixels of the two filtered images output from the filterings 100 and 200. For example, as for a pixel (x,y), the image superposition 300 produces the geometrical mean (SQRT)(p×q)) of pixel levels p and q to thereby output a final filtered pixel level. By repeating this calculation with the other pixels, the image superposition 300 produces a final filtered image. By superposing the result of vertical filtering and the result of horizontal filtering on the geometrical mean basis, it is possible to preserve the size, i.e., the edges of the target object image existing in the sonar image.

Advantages achievable with the above result of final filtering will be described in relation to the result of an actual simulation shown in FIGS. 7A–7D. FIG. 7A shows an original sonar image having 100 pixels in the vertical direction and forty pixels in the horizontal direction and including a target object T and noise No. The target object T has four pixels in the vertical direction and eight pixels in the horizontal direction while the noise No has one pixel in the vertical direction and 2 pixels in the horizontal direction. In this case, the horizontal direction image size filtering 100, FIG. 1, sets a vertical connection area size having eight pixels in the horizontal direction equal to the horizontal size of the target object T, and having eight pixels in the vertical direction greater than the vertical size of the same. The vertical image direction size filtering 200, FIG. 1, sets a horizontal connection area size having four pixels in the vertical direction equal to the vertical size of the target object T, and having sixteen pixels in the horizontal direction greater than the horizontal size of the same.

FIGS. 7B and 7C respectively show the result 70 of the horizontal filtering, FIG. 1, output from the horizontal direction image size filtering 100 and the result 71 of the vertical filtering, FIG. 1, output form the vertical direction image size filtering 200. As FIG. 7B indicates, the horizontal filtering scatters the noise No horizontally and reduces its level. On the other hand, as FIG. 7C indicates, the vertical filtering scatters the same noise No vertically and also reduces its level. The target object T, like the noise No, is extended in the vertical and horizontal directions, but preserves its level over an image size corresponding to the original image.

FIG. 7D shows the final filtered image output from the image superposition 300, FIG. 1, by the previously stated geometrical mean scheme. As shown, the final filtered image is identical with the original target object T in shape and level while the noise No is almost entirely canceled due to level suppression. The above result of simulation proves that the illustrative embodiment achieves a filtering effect matching with a desired object size.

The above embodiment may be modified to enhance rapid processing, as follows. In the illustrative embodiment, the entire bidimensional image is sequentially canned by a single pixel step on the basis of a connection area in both of the horizontal and vertical directions of the image. Alternatively, the scanning step may skip a plurality of pixels in both of the horizontal and vertical directions within a range capable of preserving the filtering effect. That is, a minimum necessary number of pixels may be omitted, or thinned, during vertical and horizontal scanning. This is successful to increase the processing speed.

Figure 8:
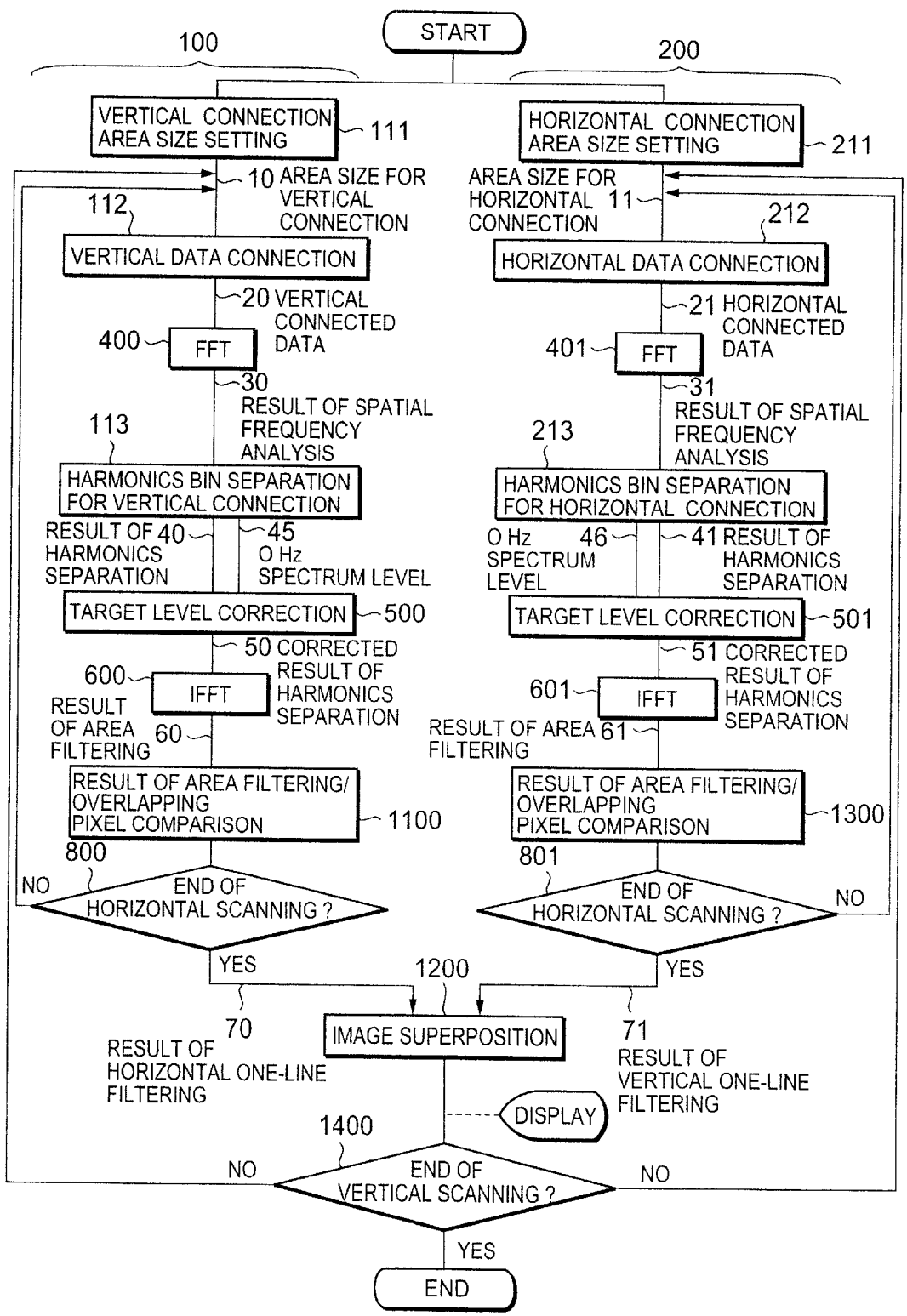
FIG. 8 shows an alternative embodiment of the present invention.

Referring to FIG. 8, an alternative embodiment of the present invention will be described. Briefly, the alternative embodiment does not execute the pixel level storage 700 or 701, FIG. 1, after the IFFT 400 or 401, FIG. 1, but determines the maximum level pixel by pixel by sequentially comparing it with the result of latest image area scanning. In this case, the result of vertical scanning 70, FIG. 1, and the result of horizontal scanning 71, FIG. 1, are available at the time when the image is entirely scanned. This obviates the need for the pixel level storage and overlapping pixel data separation of FIG. 1 and thereby saves memory capacity while enhancing rapid processing.

Specifically, as shown in FIG. 8, the horizontal direction image size filtering 100 includes an area filtering result/overlapping pixel comparison 1100. After the IFFT 600, the comparison 1100 sequentially determines the maximum level pixel by pixel by comparing it with the result of the latest image area scanning while storing the determined maximum level. The comparison 1100 is followed by an image superposition 1200 via the decision 800 assigned to horizontal scanning. Likewise, the vertical direction image size filtering 200 includes an area filtering result/overlapping pixel comparison 1300. After the IFFT 601, the comparison 1300 sequentially determines the maximum level pixel by pixel by comparing it with the result of latest image area scanning while storing the determined maximum level. The comparison 1300 is followed by the image superposition 1200 via the decision 801 assigned to horizontal scanning. A decision 1400 for determining whether or not the vertical scanning has ended is executed after the image superposition 1200. As for the rest of construction and operation, this embodiment is identical with the previous embodiment.

Figure 9:
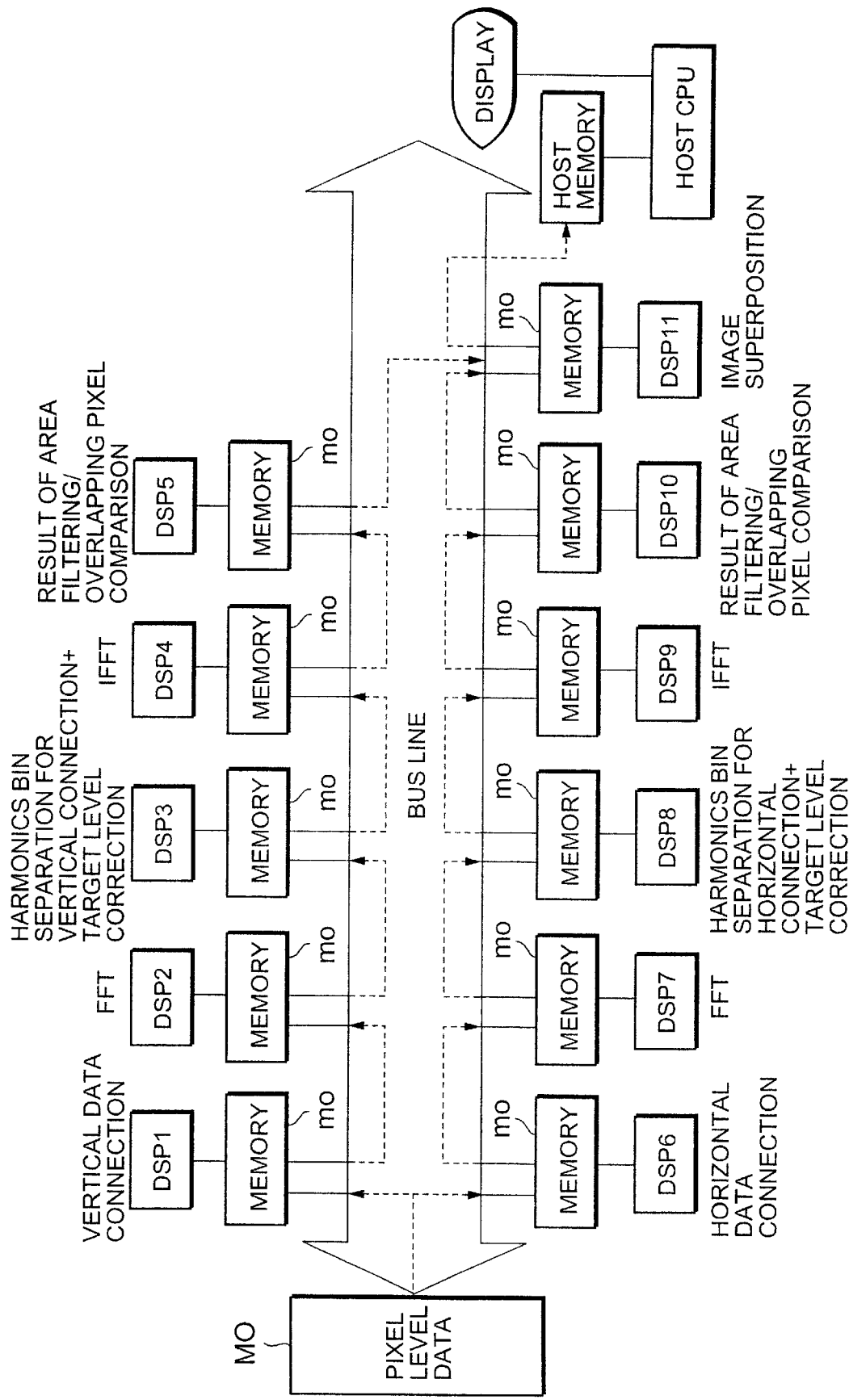
FIG. 9 shows another alternative embodiment of the present invention implementing real-time processing.

FIG. 9 shows another alternative embodiment of the present invention including parallel processors for executing the vertical and horizontal scanning of FIG. 1 at the same time. This embodiment may be combined with the embodiment of FIG. 8 in order to implement a real-time processing system. As shown, a bus line is connected to a memory MO storing bidimensional pixel level data. Processors DSP1 through DSP11 each are connected to the bus line via a respective memory mo for executing particular processing shown in FIG. 9. In FIG. 9, dashed arrows indicate the flows of data interchanged between the memories MO and mo.

If desired, in the overlapping pixel data separations 1000 and 1001 of FIG. 1, it may be possible to apply produced mean values or center values in place of the maximum values. Further, arithmetic means may be substituted for the geometrical means of the image superposition 300, FIG. 1.

Figure 10:
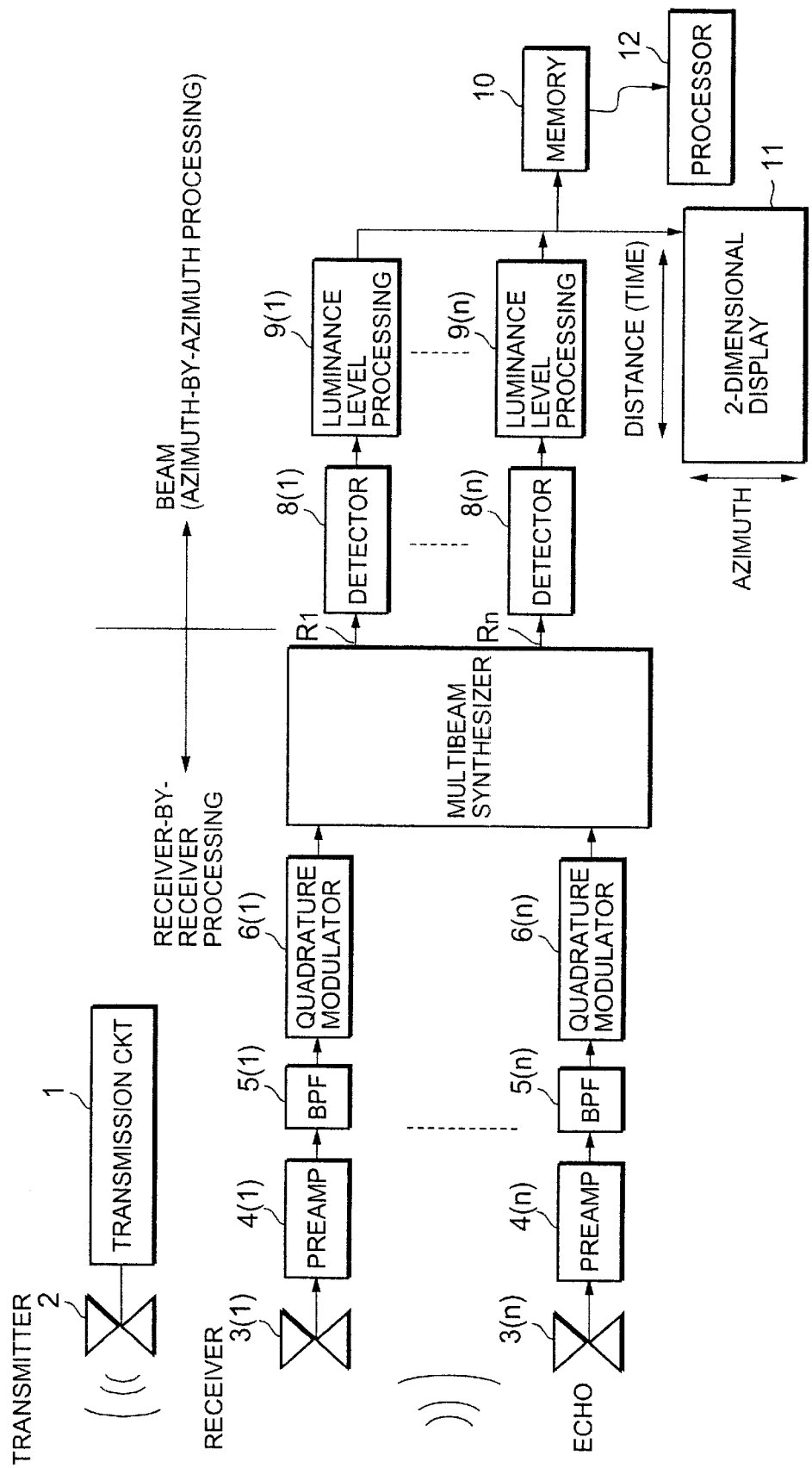
FIG. 10 is a block diagram schematically showing a sonar including any one of the illustrative embodiments.
Figure 11:
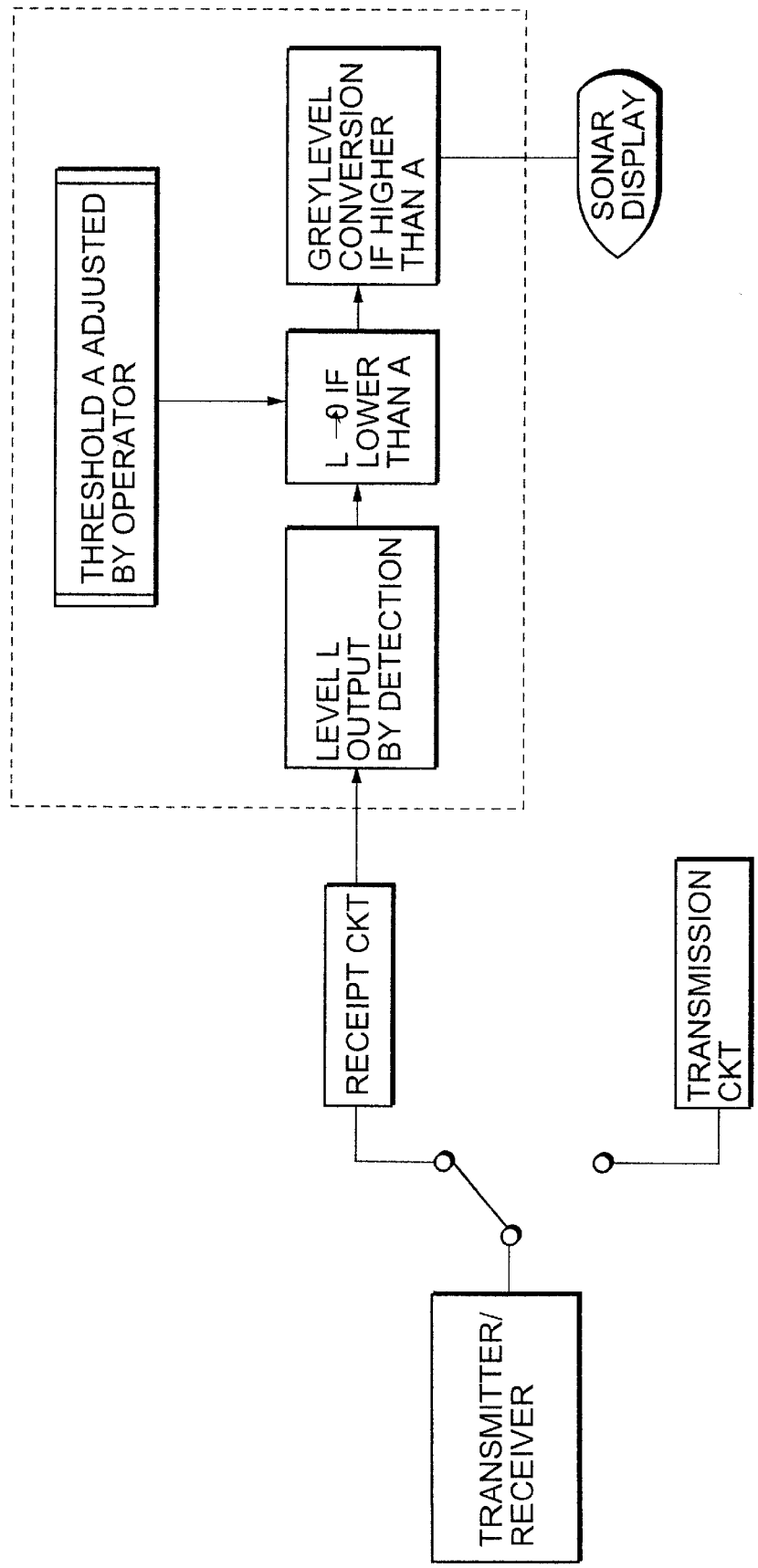
FIG. 11 is a block diagram schematically showing a conventional image processing method using a threshold.
Figure 12:
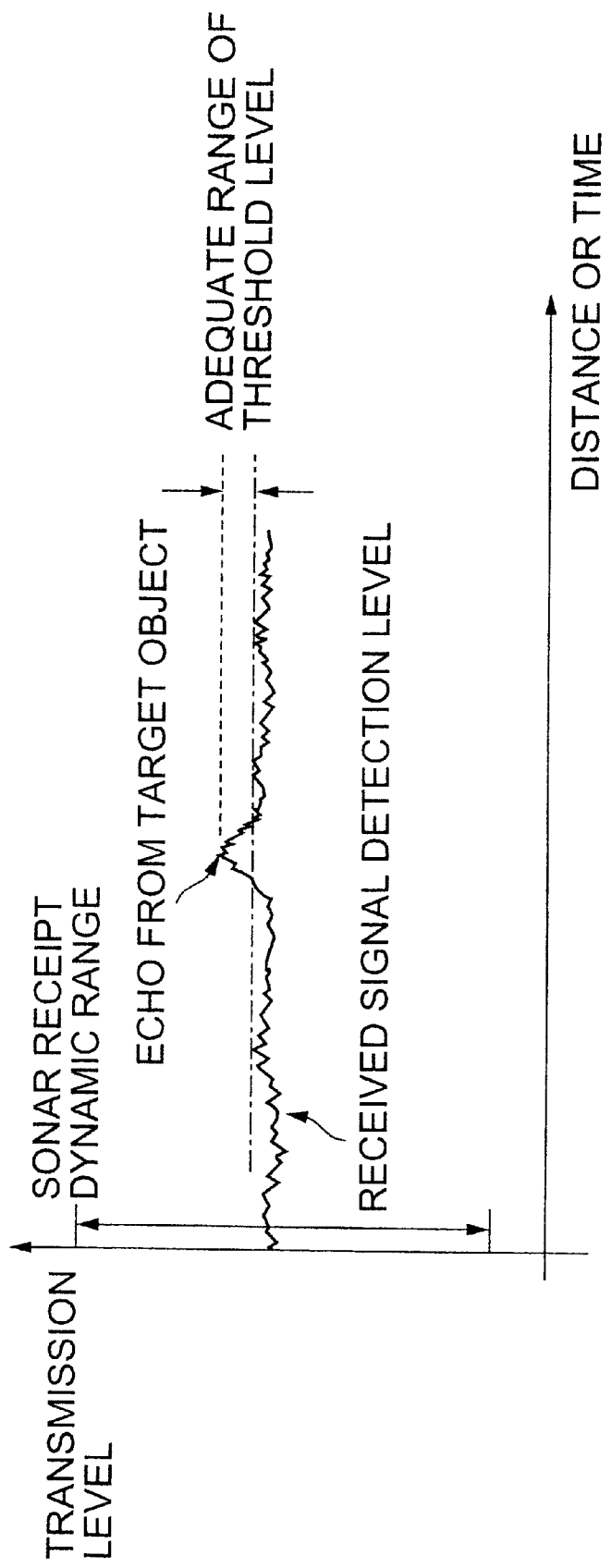

FIG. 10 shows a sonar including any one of the above illustrative embodiments. As shown, an acoustic wave generated by a transmission circuit 1 is radiated into the water via a transmitter 2 and then received by an array of receivers 3(1) through 3(n) in the form of echoes. The received echoes are respectively routed through preamplifiers (PREAMPs) 4(1) through 4(n), band-pass filters (BPSs) 5(1) through 5(n) and quadrature modulators 6(1) through 6(n) to a multibeam synthesizer 7. The multibeam synthesizer 7 synthesizes a plurality of received signals R(1) through R(m) each being assigned to a particular azimuth. The received signals R(1) through R(m) are respectively routed through detectors 8(1) through 8(m) and luminance level processors 9(1) through 9(m) in order to produce bidimensional sonar image data with respect to distance (time) and azimuth. Such sonar image data are written to a memory 10 and displayed on a bidimensional display 11. The data written to the memory 10 are fed to a processor 12 and subjected to the procedure described with, e.g., FIG. 1 or 8 thereby.

While the illustrative embodiments have been described in relation to a sonar image, the present invention is similarly applicable to any other images including a radar image for separating a target image existing in background noise.

In summary, it will be seen that the present invention provides an image data processing method and apparatus having various unprecedented advantages, as follows. First, the threshold of an image heretofore manually adjusted by an operator is automated, and even in an image whose background level noticeably varies, target objects existing in different areas can be surely detected. This is derived from the unique steps of scanning an image area by area, removing, area by area, a DC component representative of the mean level of background noise or reverberations in the spatial frequency domain, and correcting the level of a target object image level.

Second, in a target object image existing in reverberations and background noise, the reverberation level and noise level are reduced while the target object level is corrected, allowing a target object to be separated. In a sonar image, this function substantially corresponds to improvement of the S/R ratio and the S/N ratio. This is because, in the spatial frequency domain, image size filtering effected in the vertical and horizontal directions suppresses the levels of image components smaller than the preset image size of a target object, and levels of harmonics components representative of a target object are compensated by multiplying a correction factor corresponding to the suppression level of reverberations and background noise, thereby correcting the target object level.

Various modifications will become possible for those skilled in the art after receiving the teachings of the present disclosure without departing from the scope thereof.

What is claimed is:

1. A data processing method for filtering bidimensional image data to extract a preset sized target, said bidimensional image data having gradation data of pixels, said pixels being arranged in said first direction and a second direction in a bidimensional image, said second direction being perpendicular to said first direction, said preset sized target being defined by pixel numbers in said first and second directions, said data processing method comprising the steps of:
   (a) setting a connection area having size equal to said preset sized target in the first detection and greater than said preset sized target in the second direction;
   (b) sequentially obtaining gradation data of pixels in the second direction in said connection area to thereby deliver a gradation data sequence;
   (c) executing FFT (Fast Fourier Transform) with the gradation data sequence obtained in step (b) to transform the gradation data sequence into frequency domain;
   (d) extracting predetermined harmonics bins from output harmonics bins executed in step (c), said predetermined harmonics bins being determined in accordance with said preset sized target; and
   (e) executing IFFT (Inverse Fast Fourier Transform) with said predetermined harmonics bins.

2. A method as claimed in claim 1, wherein step (d) comprises a step of omitting harmonics bins other than said predetermined harmonics bins.

3. A method as claimed in claim 1, wherein assuming that said connection area is sized A1 and B1 in the second and first directions, respectively, the harmonics bins corresponding to said preset sized target are a reference frequency bin number represented by $(A1 \times B1/2)/(B1/2)$ and harmonics spectrum bin numbers represented by the reference frequency bin number$\times$N+the reference frequency bin number (N being an integer lying in a range of $0 \leq N \leq ((A1 \times B1/$ reference frequency bin number)$-2$).

4. A method as claimed in claim 1, wherein after image data processing in the first direction has completed in said connection area, said connection area is shifted by at least one pixel in the first direction with respect to the bidimensional image in order to repeat the image data processing in the first direction.

5. A method as claimed in claim 4, wherein after the image data processing in the first direction has been fully executed with respect to said bidimensional image, said connection area is shifted by at least one pixel in the second direction and the image data processing in the first direction is repeated.

6. A method as claimed in claim 1, further comprising the steps of:
   (f) separating a DC component from an output executed in step (c) as correction data; and
   (g) correcting data of said predetermined harmonics bins obtained in step (d) in accordance with said correction data.

7. An image data processing apparatus for executing filtering bidimensional image data, comprising:
   a memory for storing said bidimensional image data having gradation data of each of pixels arranged in first and second directions, said pixels making up a bidimensional image;
   subject detection size setting means for setting a subject detection size defined by a preselected number of pixels in each of the first and second directions;
   connection area setting means for setting a connection area equal in size to said subject detection size in the first direction, and greater in size than said subject detection size in the second direction;
   data connecting means for sequentially obtaining the gradation data, pixel by pixel, in the second direction in said connection area to produce a gradation data sequence;
   FFT means for executing FFT to transform said gradation data sequence into frequency domain;
   separating means for separating data of preselected harmonics bins from an output from said FFT means, said preselected harmonics bins being determined in accordance with said subject detection size; and
   IFFT means for executing IFFT to transform data of said preselected harmonics bins from said separating means into time domain.

8. An apparatus as claimed in claim 7, further comprising:
   correction factor separating means for separating a DC component from the output of said FFT means to produce a correction factor; and
   correcting means for correcting the data of said preselected harmonics bins from said bin separating means in accordance with said correction factor.

9. An image data processing apparatus to perform processing with respect to data of a bidimensional image, said bidimensional image including pixels arranged in horizontal and vertical directions, comprising:

a horizontal direction filtering unit;

a target size setting unit for setting a desired target size to be detected, said desired target size being defined by pixel numbers in said horizontal and vertical directions;

a vertical direction filtering unit; and a superposing unit for superposing filtering results of said horizontal direction filtering unit and said vertical direction filtering unit to thereby output a final result of processing, wherein (A) said horizontal direction filtering unit includes:

first setting means for setting a first connecting area in said bidimensional image in accordance with said desired target size; and first shifting means for sequentially shifting said first connecting area in the horizontal direction in said dimensional image to suppress image components less than a horizontal size of said desired target size, said first shifting means comprising means for sequentially obtaining pixel level data in said first connecting area in the vertical direction to produce first gradation data sequence, first FFT means for executing FFT to transform said first gradation data sequence into a frequency domain, and first separating means for separating first preselected frequency components from an output of said first FFT, and (B) said vertical direction filtering unit includes:

second setting means for setting a second connecting area in said bidimensional image in accordance with said desired target size; and second shifting means for sequentially shifting said second connecting area in the vertical direction in said bidimensional image to suppress image components less than a vertical size of said desired target size, said second shifting means comprising means for sequentially obtaining pixel level data in said second connecting area in the horizontal direction to produce second gradation data sequence, and second FFT means for executing FFT to transform said second gradation data sequence into a frequency domain and second separating means for separating second preselected frequency components from an output of said second FFT, said first and second preselected frequency components being determined in accordance with said desired target size.

10. An apparatus as claimed in claim 9, wherein said first connecting area is equal in size to the desired target size in the horizontal direction, and greater than said desired target size in the vertical direction, and said second connecting area is equal in size to said desired target size in the vertical direction, and greater than said desired target size in the horizontal direction.

11. An apparatus as claimed in claim 10, wherein said horizontal direction filtering unit further comprises first IFFT means for executing IFFT to inverse-transform an output of said first separating means and said vertical direction filtering unit further comprises second IFFT means for executing IFFT to inverse-transform an output of said second separating means.

12. An apparatus as claimed in claim 11, wherein said first shifting means further comprises first DC extracting means for extracting a DC component from the output of said first FFT means to produce a first correcting factor, and first correcting means disposed between said first separating means and said first IFFT means for correcting the output of said first separating means in accordance with said first correcting factor.

13. An apparatus as claimed in claim 11, wherein said second shifting means further comprises second DC extracting means for extracting a DC component from the output of said second FFT means to produce a second correcting factor, and second correcting means disposed between said second separating means and said second IFFT means for correcting the output of said second separating means in accordance with said second correcting factor.

14. An image data processing method for processing data of a bidimensional image to extract a target from said bidimensional image, said bidimensional image including pixels arranged in horizontal and vertical directions, said data being representative of gradation of each of said pixels comprising:

(a) setting a size of said target to be extracted, said size being defined by pixel number in said horizontal and vertical directions;

(b) sequentially connecting, in a bidimensional connecting area determined in accordance with said size, data of pixels in said vertical and horizontal directions to produce a gradation change signal;

(c) executing frequency analysis with said gradation change signal to thereby generate frequency harmonics components representative of said gradation change signal in a frequency domain;

(d) selecting predetermined components from said frequency harmonics components, said predetermined components corresponding to said size of said target.

15. An image data processing apparatus for processing data of a bidimensional image to detect an object, said bidimensional image having pixels arranged in horizontal and vertical directions, said data being representative of gradation of each of said pixels, comprising:

a memory for storing data of a bidimensional image;

size setting means for setting a size of said object, said size being defined by pixel numbers in the horizontal and vertical directions;

means for sequentially reading the gradation of each pixel in said vertical and horizontal directions in a connecting bidimensional area designated in said bidimensional image to produce a gradation change signal, said connecting bidimensional area being determined in accordance with said size of said object;

transforming means for transforming said gradation change signal into a frequency domain to deliver a plurality of frequency components; and selecting means for selecting desired frequency components from said plurality of frequency components transformed by said frequency analyzing means, said desired frequency components corresponding to said size of said object.

16. An image data processing apparatus as claimed in claim 15, further, comprising:

inverse-transforming means for inverse-transforming said desired frequency components from said selecting means into time domain to reproduce image data corresponding to said predetermined sized object.

* * * * *